(12) United States Patent
Kang et al.

(10) Patent No.: US 12,438,155 B2
(45) Date of Patent: Oct. 7, 2025

(54) POSITIVE ELECTRODE ADDITIVE FOR LITHIUM SECONDARY BATTERY AND POSITIVE ELECTRODE MATERIAL COMPRISING THE SAME

(71) Applicant: ECOPRO BM CO., LTD., Cheongju-si (KR)

(72) Inventors: Ju Kyoung Kang, Cheongju-si (KR); Moon Ho Choi, Cheongju-si (KR); Seung Hyun Choi, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 446 days.

(21) Appl. No.: 17/459,967

(22) Filed: Aug. 27, 2021

(65) Prior Publication Data
US 2022/0131149 A1 Apr. 28, 2022

(30) Foreign Application Priority Data

Oct. 23, 2020 (KR) .................. 10-2020-0138272

(51) Int. Cl.
| | | |
|---|---|---|
| *H01M 4/62* | (2006.01) | |
| *H01M 4/02* | (2006.01) | |
| *H01M 4/525* | (2010.01) | |
| *H01M 10/0525* | (2010.01) | |
| *H01M 10/42* | (2006.01) | |

(52) U.S. Cl.
CPC ............. *H01M 4/62* (2013.01); *H01M 4/525* (2013.01); *H01M 4/628* (2013.01); *H01M 10/0525* (2013.01); *H01M 10/4235* (2013.01); *H01M 2004/021* (2013.01); *H01M 2004/028* (2013.01)

(58) Field of Classification Search
CPC ...... H01M 4/133; H01M 4/362; H01M 4/587; H01M 4/62; H01M 10/0525; H01M 2004/027; H01M 4/624; H01M 4/626; H01M 4/628; H01M 10/4235; C01G 53/00; C01G 53/006
See application file for complete search history.

(56) References Cited

U.S. PATENT DOCUMENTS

| | | | | |
|---|---|---|---|---|
| 2010/0203386 A1* | 8/2010 | Chang | ................... | H01M 4/364 |
| | | | | 429/231.95 |
| 2018/0287135 A1* | 10/2018 | Shin | ........................ | H01M 4/525 |
| 2020/0266441 A1* | 8/2020 | Yoshihara | .............. | C01G 53/50 |
| 2020/0335790 A1* | 10/2020 | Han | ......................... | H01B 1/08 |
| 2021/0226203 A1* | 7/2021 | Liu | ........................ | H01M 4/525 |
| 2021/0265614 A1* | 8/2021 | Lee | ........................ | H01M 4/131 |

FOREIGN PATENT DOCUMENTS

| | | |
|---|---|---|
| CN | 110447132 A | 11/2019 |
| CN | 110573459 A | 12/2019 |
| EP | 3 331 067 A1 | 6/2018 |
| EP | 3 486 979 A1 | 5/2019 |
| JP | 2020-518967 A | 6/2020 |
| KR | 10-2019-0059115 A | 5/2019 |
| KR | 10-2019-0059242 A | 5/2019 |
| KR | 10-2020-0022313 A | 3/2020 |

* cited by examiner

*Primary Examiner* — Armindo Carvalho, Jr.
(74) *Attorney, Agent, or Firm* — Studebaker Brackett PLLC

(57) ABSTRACT

The present invention relates to a positive electrode additive for a lithium secondary battery and a positive electrode material including the same, and more particularly, to a positive electrode additive for a lithium secondary battery, which enables stable maintenance of the electrochemical properties of a lithium secondary battery by reducing irreversible capacity loss of a negative electrode and reductions in gelation and gas generation, caused by a conventional positive electrode additive, and a positive electrode material including the same.

10 Claims, No Drawings

POSITIVE ELECTRODE ADDITIVE FOR LITHIUM SECONDARY BATTERY AND POSITIVE ELECTRODE MATERIAL COMPRISING THE SAME

CROSS-REFERENCE TO RELATED APPLICATION

This application claims priority to and the benefit of Korean Patent Application No. 10-2020-0138272, filed on Oct. 23, 2020, the disclosure of which is incorporated herein by reference in its entirety.

BACKGROUND

1. Field of the Invention

The present invention relates to a positive electrode additive for a lithium secondary battery and a positive electrode material including the same, and more particularly, to a positive electrode additive for a lithium secondary battery, which enables stable maintenance of the electrochemical properties of a lithium secondary battery by reducing irreversible capacity loss of a negative electrode and reductions in gelation and gas generation, caused by a conventional positive electrode additive, and a positive electrode material including the same.

2. Discussion of Related Art

Batteries store electrical power by using materials facilitating an electrochemical reaction at a positive electrode and a negative electrode. As a representative example of such batteries, there is a lithium secondary battery storing electrical energy due to a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is produced by charging an organic electrolyte solution or a polymer electrolyte solution between the positive electrode and the negative electrode.

A lithium composite oxide is used as a positive electrode active material of the lithium secondary battery, and composite oxides such as $LiCoO_2$, $LiMn_2O_4$, $LiNiO_2$, $LiMnO_2$, etc. are being studied.

Meanwhile, recently, as the demand for a high-capacity lithium secondary battery increases, a positive electrode active material capable of exhibiting higher capacity characteristics is used, and at the same time, a non-carbon-based negative electrode active material using silicon with high reversible capacity is used instead of graphite which is generally used.

However, the non-carbon-based negative electrode active material, particularly, silicon of the negative electrode active materials, has a limitation in that it cannot express sufficient capacity because its initial efficiency is low and Li consumption is large during initial charging and discharging. Accordingly, to satisfy the Li consumption of the non-carbon-based negative electrode active material, there is an attempt to use a positive electrode additive (e.g., $Li_2NiO_2$) including excessive Li, capable of sufficiently providing Li of the positive electrode active material.

In the process of preparing the positive electrode additive containing excessive Li, excessive unreacted Li (Li byproduct) is generated, and the Li byproduct may abnormally increase the viscosity of a positive electrode material and may be gelated in the preparation of the positive electrode material, and causes gas generation according to the progression of charging/discharging after the preparation of the electrode. $Li_2CO_3$, which is a representative Li byproduct, does not only increase the swelling phenomenon of a cell, thereby reducing cycles, but also acts as a cause of the swelling of the battery.

Therefore, it is necessary to develop a positive electrode additive for a lithium secondary battery, which enables stable maintenance of the electrochemical properties of a lithium secondary battery by reducing the irreversible capacity loss of a negative electrode and reductions in gelation and gas generation caused by the conventional positive electrode additive.

SUMMARY OF THE INVENTION

The present invention is directed to providing a positive electrode additive, which is added to a positive electrode active material to satisfy Li consumption of a conventional negative electrode active material with a high reversible capacity, and by containing a relatively small amount of Li byproduct to be mixed with a positive electrode active material, has a low possibility of abnormally increasing the viscosity of a positive electrode material or being gelated in the preparation of the positive electrode material.

In addition, the present invention is directed to providing a positive electrode additive, which enables the inhibition of gas generation in charging/discharging or storage of a lithium secondary battery by reducing a Li byproduct by simultaneously introducing Al doping and B coating to the positive electrode additive, and stable improvement in electrochemical properties.

In addition, the present invention is also directed to providing a positive electrode material which includes the positive electrode additive defined herein and a positive electrode active material.

In addition, the present invention is also directed to providing a positive electrode, which includes the positive electrode material defined herein.

Moreover, the present invention is also directed to providing a lithium secondary battery using the positive electrode defined herein.

One aspect of the present invention provides a positive electrode additive which includes a lithium metal oxide represented by Formula 1 below as a positive electrode additive for a lithium secondary battery enabling stable maintenance of the electrochemical properties of a lithium secondary battery by reducing irreversible capacity loss of a negative electrode and reductions in gelation and gas generation, caused by a conventional positive electrode additive.

 [Formula 1]

(Here,
M1 is at least one selected from W, Si, Ga and P,
$-0.2 \leq a \leq 0.2$, $0 < b \leq 0.05$, $0 < c \leq 0.05$, $0 < d \leq 0.05$, and $0 \leq e \leq 0.2$.)

In one embodiment, the content of $Li_5AlO_4$ with respect to the total weight of the positive electrode additive may be 0.5 wt % or less, and the content of NiO with respect to the total weight of the positive electrode additive may be less than 11.0 wt %.

In addition, a coating layer in which a B-containing oxide is present may be formed on at least a part of the surface of the lithium metal oxide, and the B-containing oxide may be represented by Formula 2 below.

[Formula 2]

(Here,
M2 is at least one selected from Mn, P, Sr, Ba, Ti, Zr, Al, Hf, Ta, Mg, V, Zn, Si, Y, Sn, Ge, Nb, W and Cu,
$0 < f \leq 0.8$, $0 < g \leq 8$, $0 \leq h \leq 8$, and $0 < i \leq 13$.)

In addition, another aspect of the present invention provides a positive electrode material which includes the above-described positive electrode additive and a positive electrode active material.

Here, the positive electrode active material may be represented by Formula 3 below.

[Formula 3]

(Here,
M3 is at least one selected from Mn or Al,
M4 is at least one selected from Mn, P, Sr, Ba, B, Ti, Zr, Al, Hf, Ta, Mg, V, Zn, Si, Y, Sn, Ge, Nb, W and Cu,
M3 and M4 are different elements,
$0.5 \leq w \leq 1.5$, $0 \leq x \leq 0.50$, $0 \leq y \leq 0.20$, $0 \leq z \leq 0.20$, and $0 \leq \alpha \leq 0.02$.)

In addition, still another aspect of the present invention provides a positive electrode, which includes the above-described positive electrode material.

Moreover, yet another aspect of the present invention provides a lithium secondary battery using the above-described positive electrode.

DETAILED DESCRIPTION OF EXEMPLARY EMBODIMENTS

In order to better understand the present invention, certain terms are defined herein for convenience. Unless defined otherwise herein, scientific and technical terms used herein will have meanings commonly understood by those of ordinary skill in the art. In addition, unless specifically indicated otherwise, terms in a singular form also include plural forms, and terms in a plural form should be understood to include singular forms as well.

Hereinafter, a positive electrode additive according to the present invention, a positive electrode material including the positive electrode additive and a positive electrode active material, a positive electrode including the positive electrode material, and a lithium secondary battery using the positive electrode will be described in further detail.

Positive Electrode Additive

According to one aspect of the present invention, a positive electrode additive for a lithium secondary battery which enables stable maintenance of the electrochemical properties of a lithium secondary battery by reducing irreversible capacity loss of a negative electrode and reductions in gelation and gas generation, caused by a conventional positive electrode additive, is provided.

Here, the positive electrode additive includes a lithium metal oxide which includes excessive lithium (approximately 2 M), compared to a positive electrode active material generally including approximately 1 M of lithium, and may irreversibly deintercalate lithium in charging/discharging of a battery.

In the case of a negative electrode active material (e.g., a silicon-based negative electrode active material) with a high reversible capacity, there is a problem that it is difficult to express sufficient capacity during initial charging/discharging due to low initial efficiency, but when the above-described positive electrode additive is used after being added to the positive electrode active material, it is possible to alleviate the imbalance of irreversible capacity between a positive electrode and a negative electrode.

However, in the case of the positive electrode additive including excessive lithium, unreacted Li (Li byproduct) is unavoidably generated during the preparation process, and the Li byproduct may be the cause of abnormally increasing the viscosity of the positive electrode material mixed with the positive electrode active material or gelating the positive electrode material. In addition, the Li byproduct may lead to gas generation in charging/discharging or storage of a lithium secondary battery.

Accordingly, the present invention provides a positive electrode additive including a lithium metal oxide represented by Formula 1 below, and as the positive electrode additive represented by Formula 1 below includes a relatively smaller content of Li byproduct than a conventional positive electrode additive (e.g., $Li_2NiO_2$), the problem of reducing stability caused by the Li byproduct may be solved, and it is possible to express the improved electrochemical properties by mixing the positive electrode additive with the positive electrode active material.

[Formula 1]

(Here,
M1 is at least one selected from W, Si, Ga and P,
$-0.2 \leq a \leq 0.2$, $0 < b \leq 0.05$, $0 < c \leq 0.05$, $0 < d \leq 0.05$, and $0 \leq e \leq 0.2$.)

The lithium metal oxide is a lithium composite oxide in the form of a single crystal, and the single crystal refers to a grain or crystallite.

The average particle diameter of the lithium metal oxide may be 3 to 20 μm.

Al, B and M1 in the lithium metal oxide represented by Formula 1 are present in a state in which some of the Ni element in the lithium metal oxide having an Li—Ni—O crystal structure is substituted, and may contribute to stabilization of the crystal structure of the lithium metal oxide and reduction in the generation of a Li byproduct in the preparation of the lithium metal oxide.

In addition, a coating layer in which a B-containing oxide is present may be formed on at least a part of the surface of the lithium metal oxide. The coating layer is preferably formed to a thickness of 1 to 100 nm.

When the thickness of the coating layer is less than 1 nm, an effect of improving electrochemical properties and/or stability according to the presence of the coating layer on the surface of the lithium metal oxide may be insignificant. On the other hand, when the thickness of the coating layer is more than 100 nm, the coating layer is excessively thick such that the migration of lithium ions is disturbed, and there is a risk of deteriorating the electrochemical properties.

The B-containing oxide may be a borate-based compound or lithium borate (LBO)-based compound represented by Formula 2 below.

[Formula 2]

(Here,
M2 is at least one selected from Mn, P, Sr, Ba, Ti, Zr, Al, Hf, Ta, Mg, V, Zn, Si, Y, Sn, Ge, Nb, W and Cu,
$0 < f \leq 0.8$, $0 < g \leq 8$, $0 \leq h \leq 8$, and $0 < i \leq 13$.)

Non-limiting examples of the oxide not including M2 among the B-containing oxides represented by Formula 2 may include $B_2O_3$, $Li_2O$—$B_2O_3$, $Li_3BO_3$, $Li_2B_4O_7$, $Li_2B_2O_7$, and $Li_2B_8O_{13}$.

Meanwhile, a content c of B in the lithium metal oxide represented by Formula 1 may be determined by a doped content in the lithium metal oxide in the process of forming a coating layer in which a B-containing oxide is present on at least a part of the surface of the lithium metal oxide.

Here, a molar ratio of B and Al (B/Al molar ratio) in the positive electrode additive is preferably 0.5 to 10. When the B/Al molar ratio in the positive electrode additive is less than 0.5, as the absolute content of B in the positive electrode additive is smaller, the effect of improving electrochemical properties and/or stability may be insignificant. However, when the B/Al molar ratio in the positive electrode additive is more than 10.0, rather, the electrochemical properties may be deteriorated.

In one embodiment, Al that substitutes for some of the Ni element in the Li—Ni—O crystal structure of the lithium metal oxide represented by Formula 1 is preferably uniformly dispersed in the lithium metal oxide. In addition, Al is preferably not present as an oxide independent of the lithium metal oxide represented by Formula 1.

Particularly, as the deviation of Al/Ni is uniformly maintained throughout the surface, core, and center of the lithium metal oxide, the effect of improving electrochemical properties according to the positive electrode additive may be stably maintained.

On the other hand, when Al in the lithium metal oxide is present as an independent oxide instead of substituting for some of the Ni in the Li—Ni—O crystal structure, it may be referred to as an Al-containing impurity.

The Al-containing impurity may be an aluminate-based compound or lithium aluminate (Li—Al—O)-based compound, represented by Formula 2-1 below.

$$Li_jAl_kM2_lO_m \quad \text{[Formula 2-1]}$$

(Here,
M2 is at least one selected from Mn, P, Sr, Ba, B, Ti, Zr, Hf, Ta, Mg, V, Zn, Si, Y, Sn, Ge, Nb, W and Cu,
$0 \leq j \leq 6$, $0 < k \leq 8$, $0 \leq l \leq 8$, and $0 < m \leq 13$.)

Particularly, the Al-containing impurity may include $Li_5AlO_4$.

A $Li_5AlO_4$ content in the positive electrode additive confirmed through XRD analysis for the positive electrode additive is preferably 3.0 wt % or less with respect to the total weight of the positive electrode additive.

An Al-containing impurity such as $Li_5AlO_4$ in the positive electrode additive is more likely to be locally aggregated in a partial region of the lithium metal oxide rather than being uniformly present in the lithium metal oxide. As such, the Al-containing impurity locally aggregated in a partial region of the lithium metal oxide may cause the instability of the positive electrode additive.

In addition, a content of NiO in the positive electrode additive confirmed through XRD analysis for the positive electrode additive is preferably less than 11.0 wt % with respect to the total weight of the positive electrode additive.

The NiO is an oxide used as a precursor of the lithium metal oxide, like $Li_2O$, and as the content of NiO remaining in the positive electrode additive increases, it means that the degree of lithiation of NiO is low.

According to the present invention, NiO and $Li_2O$, which are precursors of the lithium metal oxide, and an A-containing raw material and a B-containing raw material, which are added for doping and coating the lithium metal oxide, can promote NiO lithiation, and thus it is possible to reduce the content of NiO remaining in the positive electrode additive.

On the other hand, as the degree of NiO lithiation decreases, the content of unreacted $Li_2O$ also increases, and unreacted $Li_2O$ may be titrated as LiOH. LiOH may be referred to as unreacted Li, that is, a Li byproduct, along with $Li_2CO_3$, and the content of the Li byproduct (the sum of the contents of LiOH and $Li_2CO_3$) is preferably less than 1.45 wt % with respect to the total weight of the positive electrode additive.

Positive Electrode Material

According to another aspect of the present invention, a positive electrode material including the above-described positive electrode additive and a positive electrode active material is provided. In the positive electrode material, the positive electrode additive and the positive electrode active material may be mixed in a weight ratio of 1:99 to 40:60.

The positive electrode active material is a lithium composite oxide enabling lithium intercalation/deintercalation, and may be a lithium composite oxide having a layered crystal structure, containing at least Ni and Co.

More specifically, the positive electrode active material may include a lithium composite oxide represented by Formula 3 below.

$$Li_wNi_{1-(x+y+z)}Co_xM3_yM4_zO_{2+\alpha} \quad \text{[Formula 3]}$$

(Here,
M3 is at least one selected from Mn and Al,
M4 is at least one selected from Mn, P, Sr, Ba, B, Ti, Zr, Al, Hf, Ta, Mg, V, Zn, Si, Y, Sn, Ge, Nb, W and Cu,
M3 and M4 are different elements,
$0.5 \leq w \leq 1.5$, $0 \leq x \leq 0.50$, $0 \leq y \leq 0.20$, $0 \leq z \leq 0.20$, and $0 \leq \alpha \leq 0.02$.)

If the positive electrode active material includes the lithium composite oxide represented by Formula 3, the lithium composite oxide may be a high-Ni-type lithium composite oxide in which x+y+z in Formula 3 is 0.20 or less.

Meanwhile, the positive electrode active material mixed with the positive electrode additive does not necessarily include only an NCA or NCM-type lithium composite oxide represented by Formula 3, but may also include various lithium composite oxides known in the art, which can be used in combination with the positive electrode additive.

In addition, the positive electrode active material may be a single-crystalline or polycrystalline lithium composite oxide, and preferably, a polycrystalline lithium composite oxide. A polycrystalline lithium composite oxide refers to an aggregate including primary particles and secondary particles in which the plurality of the first particles aggregate.

The primary particle refers to one grain or crystallite, and the secondary particle refers to an aggregate formed by aggregation of a plurality of primary particles. There may be voids and/or a grain boundary between the primary particles constituting the secondary particle.

For example, the primary particle may be spaced apart from a neighboring primary particle in the secondary particle, thereby forming an inner void. In addition, the primary particle may not form a grain boundary by being in contact with a neighboring primary particle, but may be in contact with an inner void, thereby forming a surface present inside the secondary particle.

Meanwhile, a surface of the primary particle exposed to the outside air, present on the outermost surface of the secondary particle, forms the surface of the secondary particle.

Here, as the average particle diameter of the primary particle may be 0.1 to 5 μm, preferably, 0.1 to 3 μm, the optimum densities of the positive electrodes formed using positive electrode active materials according to various embodiments of the present invention may be realized. In addition, the average particle diameter of the secondary particle may vary according to the number of aggregated primary particles, but may be 3 to 20 μm.

In addition, the primary particle and/or the secondary particle may have a rod, oval and/or amorphous shape.

Additionally, there may be a shell layer including an oxide represented by Formula 4 below on at least a part of the surface of the lithium composite oxide. That is, the shell layer may be defined as a region in which the oxide represented by Formula 4 below is present.

$$Li_nM5_oO_p \qquad \text{[Formula 4]}$$

(Here,

M5 is at least one selected from the group consisting of Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, $0 \le n \le 10$, $0 < o \le 8$, and $0 < p \le 13$.)

In addition, the shell layer may include different types of oxides in one layer, or the different types of oxides represented by Formula 4 may be present in separate layers.

The oxide represented by Formula 4 may be physically and/or chemically bonded with the lithium composite oxide. In addition, the oxide may form a solid solution with the lithium composite oxide.

The oxide is an oxide in which lithium and an element represented by M5 are combined or an oxide of M5, and may be, for example, $Li_nW_oO_p$, $Li_nZr_oO_p$, $Li_nTi_oO_p$, $Li_nNi_oO_p$, $Li_nB_oO_p$, $W_nO_p$, $Zr_nO_p$, $Ti_nO_p$ or $B_nO_p$, but above examples are merely described for convenience of understanding, and the oxide defined in the present invention is not limited to the above-described examples.

In another embodiment, the oxide may be or may further include an oxide in which lithium and at least two types of elements represented by M5 are combined. The oxide in which lithium and at least two types of elements represented by M5 are combined may be, for example, $Li_a(W/Ti)_bO_c$, $Li_a(W/Zr)_bO_c$, $Li_a(W/Ti/Zr)_bO_c$, or $Li_a(W/Ti/B)_bO_c$, but the present invention is not necessarily limited thereto.

Here, the oxide may have a concentration gradient decreasing from the surface toward the center of the lithium composite oxide. Accordingly, the concentration of the oxide may decrease from the outermost surface of the lithium composite oxide toward the center of the lithium composite oxide.

As described above, as the oxide has a concentration gradient decreasing from the surface toward the center of the lithium composite oxide, a Li byproduct present on the surface of the lithium composite oxide may be effectively reduced. In addition, a decrease in crystallinity in the inner surface region of the lithium composite oxide caused by the oxide may be prevented. In addition, the breakdown of the entire structure of the positive electrode active material due to the oxide in an electrochemical reaction may be prevented.

In addition, the shell layer may include a first shell layer including at least one oxide represented by Formula 4, and a second shell layer including at least one oxide represented by Formula 4, which is different from the oxide included in the first shell layer.

Lithium Secondary Battery

Still another aspect of the present invention may provide a positive electrode including a positive electrode current collector and a positive electrode material layer formed on the positive electrode current collector. Here, the positive electrode material layer may include positive electrode materials according to various embodiments of the present invention. Therefore, since the positive electrode material is the same as described above, detailed description thereof will be omitted for convenience, and hereinafter, other components that have not been described will be described.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 µm, and fine irregularities may be formed on the surface of the current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode material layer may be prepared by coating the positive electrode current collector with a positive electrode slurry composition including the positive electrode material, a conductive material, and a binder included optionally as needed.

Here, the positive electrode material is included at 80 to 99 wt %, and specifically, 85 to 98.5 wt % with respect to the total weight of the positive electrode material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode material layer.

The binder serves to improve attachment between particles of the positive electrode material (a positive electrode additive and a positive electrode active material) and the adhesive strength between the positive electrode material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode material layer.

The positive electrode may be manufactured according to a conventional method of manufacturing a positive electrode, except that the above-described positive electrode material is used. More specifically, the positive electrode may be manufactured by coating the positive electrode current collector with a positive electrode slurry composition prepared by dissolving or dispersing the positive electrode material, and optionally, a binder and a conductive material in a solvent, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode material, the conductive material and the binder and then imparting a viscosity for exhibiting excellent thickness uniformity when the slurry is applied to prepare a positive electrode.

In addition, in another exemplary embodiment, the positive electrode may be prepared by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator and an electrolyte, which are interposed between the positive electrode and the negative electrode. Here, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator, and optionally, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 μm, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer may be formed by coating the negative electrode current collector with a negative electrode slurry composition including the negative electrode active material, a conductive material and a binder optionally included as needed.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ (0<β<2), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer may be prepared by coating the negative electrode current collector with a negative electrode slurry composition prepared by dissolving or dispersing a negative electrode active material, and optionally, a binder and a conductive material in a solvent, and drying the coated composition, or may be prepared by casting the negative electrode slurry composition on a separate support and then laminating a film delaminated from the support on the negative electrode current collector.

Meanwhile, in the lithium secondary battery, a separator is not particularly limited as long as it is generally used in a lithium secondary battery to separate a negative electrode from a positive electrode and provide a diffusion path for lithium ions, and particularly, the separator has a low resistance to ion mobility of an electrolyte and an excellent electrolyte solution impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be optionally used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which is able to be used in the production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, γ-butyrolacton, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of approximately 1:1 to 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt is preferably in the range of 0.1 to 2.0 M. When the concentration of the lithium salt is included in the above-mentioned range, the electrolyte has suitable conductivity and viscosity and thus can exhibit excellent electrolytic performance Therefore, lithium ions can effectively migrate.

To enhance lifetime characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and excellent lifetime characteristics, it is useful in portable devices such as a mobile phone, a notebook computer and a digital camera and an electric automobile field such as a hybrid electric vehicle (HEV).

The appearance of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

According to yet another exemplary embodiment of the present invention, a battery module including the lithium secondary battery as a unit cell and/or a battery pack including the same is provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in further detail with reference to examples. However, these examples are merely provided to explain the present invention, and it will not be interpreted that the scope of the present invention is limited by the examples below.

Example 1

Preparation Example 1. Preparation of Positive Electrode Additive (1) Example 1

A spherical $Ni(OH)_2$ precursor was synthesized by a co-precipitation method. Specifically, 25 wt % of NaOH and 28 wt % of $NH_4OH$ were added to 2.5 M $NiSO_4 \cdot 6H_2O$ in a 90 L reactor. The pH in the reactor was maintained at 10.0 to 12.0, the reactor temperature was maintained at 45 to 50° C., and an inert gas $N_2$ was added to the reactor to prevent oxidation of the prepared precursor. After synthesis and stirring were completed, washing and dehydration were performed using filter press (F/P) equipment, thereby obtaining a $Ni(OH)_2$ precursor having an average diameter of 14 μm.

Subsequently, the synthesized precursor was thermally treated for 5 hours by raising a temperature 2° C. per minute until 550° C. while an air atmosphere was maintained, followed by furnace cooling.

Subsequently, an $Li_2O$ content was weighed, and respective $Al_2O_3$ and $H_3BO_3$ contents of 0.5 mol % and 1.5 mol % were weighed such that an Li/M ratio of the synthesized precursor became 2.02, and NiO, $Li_2O$, $Al_2O_3$ and $H_3BO_3$ were mixed and then thermally treated for 10 hours by raising a temperature 1° C. per minute until 650° C. while an $N_2$ atmosphere was maintained in a calcination furnace, thereby obtaining a positive electrode additive having an average diameter of 14 μm.

The result of ICP analysis for the composition of the positive electrode active material is shown in Table 1 below.

(2) Example 2

A positive electrode additive was prepared in the same manner as in Example 1, except that an $Al_2O_3$ content was weighed to be 2.5 mol %, instead of 0.5 mol %, before mixing.

(3) Example 3

A positive electrode additive was prepared in the same manner as in Example 1, except that a $H_3BO_3$ content was weighed to be 4 mol %, instead of 1.5 mol %, before mixing.

(4) Comparative Example 1

A positive electrode additive was prepared in the same manner as in Example 1, except that a $Li_2O$ content was weighed such that an Li/M ratio of a synthesized precursor became 2.02, and only NiO and $Li_2O$ were mixed and then thermally treated.

(5) Comparative Example 2

A positive electrode additive was prepared in the same manner as in Example 1, except that a $Li_2O$ content was weight such that an Li/M ratio of a synthesized precursor became 2.02, an $Al_2O_3$ content was weighed to be 0.5 mol %, and NiO, $Li_2O$ and $Al_2O_3$ were mixed and thermally treated.

(6) Comparative Example 3

A positive electrode additive was prepared in the same manner as in Example 1, except that a $Li_2O$ content was weight such that an Li/M ratio of a synthesized precursor became 2.02, a $H_3BO_3$ content was weight to be 1.5 mol %, and NiO, $Li_2O$ and $H_3BO_3$ were mixed and then thermally treated.

(7) Comparative Example 4

A positive electrode additive was prepared in the same manner as in Example 1, except that a $Al_2O_3$ content was weighed to be 3.5 mol %, instead of 0.5 mol % before mixing.

(8) Comparative Example 5

A positive electrode additive was prepared in the same manner as in Example 1, except that a $H_3BO_3$ content was weight to be 5.5 mol %, instead of 1.5 mol %, before mixing.

(9) Comparative Example 6

A positive electrode additive was prepared in the same manner as in Example 1, except that a $H_3BO_3$ content was weight to be 0.2 mol %, instead of 1.5 mol %, before mixing.

Preparation Example 2. Production of Lithium Secondary Battery

Each of the positive electrode additives prepared according to Preparation Example 1 was used as a positive electrode active material, and a positive electrode slurry was prepared by dispersing 92 wt % of the positive electrode additive, 4 wt % of artificial graphite and 4 wt % of a PVDF binder in 30 g of N-methyl-2-pyrrolidone (NMP). The positive electrode slurry was uniformly applied to an aluminum thin film having a thickness of 15 μm, and vacuum-dried at 135° C., thereby manufacturing a positive electrode for a lithium secondary battery.

A coin battery was produced using the above positive electrode, a lithium foil as a counter electrode for the positive electrode, a porous polyethylene film (Celgard 2300, thickness: 25 μm) as a separator, and an electrolyte solution in which $LiPF_6$ was present at a concentration of 1.15 M in a solvent prepared by mixing ethylene carbonate and ethyl methyl carbonate in a volume ratio of 3:7.

Experimental Example 1. XRD Analysis of Positive Electrode Additive

X-ray diffraction (XRD) for each of the positive electrode additives according to Preparation Example 1 was performed to assess NiO and $Li_5AlO_4$ contents in the positive electrode additive. The XRD analysis was performed by a method of detecting peaks corresponding to NiO and $Li_5AlO_4$ with a Bruker D8 Advance diffractometer using Cu Kα radiation (1.540598 Å). The XRD analysis results are shown in Table 1 below.

TABLE 1

| Classification | NiO (wt %) | $Li_5AlO_4$ (wt %) |
| --- | --- | --- |
| Example 1 | 7.3 | 0.28 |
| Example 2 | 10.6 | 2.16 |
| Example 3 | 8.7 | 0.24 |
| Comparative Example 1 | 11 | — |
| Comparative Example 2 | 10.3 | 0.41 |
| Comparative Example 3 | 11.2 | — |
| Comparative Example 4 | 9.7 | 3.12 |
| Comparative Example 5 | 9.6 | 0.24 |
| Comparative Example 6 | 10.7 | 0.36 |

Referring to the results of Example 1 and Comparative Example 2, it was confirmed that the $Li_5AlO_4$ content in the positive electrode additive according to Example 1 was smaller even though the content of $Al_2O_3$ mixed in the preparation of the positive electrode additive was the same. This result is expected to result from the promotion of NiO lithiation due to simultaneous use of an Al-containing raw material and a B-containing raw material compared to the case in which an Al-containing raw material was used alone in calcination of a mixture of NiO and $Li_2O$, and thereby reduction in the content of NiO remaining in the positive electrode additive.

In addition, referring to the results of Example 1 and Comparative Example 6, it can be confirmed that, even with the same $Al_2O_3$ content mixed in the preparation of the positive electrode additive, the NiO content in the positive electrode additive according to Example 1 was smaller. The result is expected to result from insufficient induction of NiO lithiation by the reduction in a B-containing raw material compared to the content of an Al-containing raw material in calcination of the mixture of NiO and $Li_2O$.

Referring to the results of Example 1 and Comparative Example 2, it can be confirmed that the $Li_5Al_5O_4$ content in the positive electrode additive according to Example 1 was smaller even with the same $Al_2O_3$ content mixed in the preparation of the positive electrode additive. The result is expected to result from no aggregation of Al in the positive electrode additive in the form of $Li_5AlO_4$ and uniform dispersion and doping in the positive electrode additive since a B-containing raw material served as a flux in the simultaneous calcination of NiO, $Li_2O$, and the mixture of the Al-containing raw material and the B-containing raw material. Meanwhile, it was confirmed that as the content of $Al_2O_3$ mixed in the preparation of the positive electrode additive according to Comparative Example 4 increased, an excessive content of $Li_5AlO_4$ was detected in the positive electrode additive.

In addition, referring to the results of Example 1 and Comparative Example 6, it was confirmed that the $Li_5AlO_4$ content in the positive electrode additive according to Example 1 was smaller even with the same content of $Al_2O_3$ mixed in the preparation of the positive electrode additive. This result is expected to result from insufficient inhibition of the aggregation of Al of the positive electrode additive in the form of $Li_5AlO_4$ since the amount of a B-containing raw material serving as a flux was relatively smaller in the simultaneous calcination of NiO, $Li_2O$, and the mixture of the Al-containing raw material and the B-containing raw material.

Experimental Example 2. Measurement of Unreacted Lithium in Positive Electrode Additive Unreacted lithium in each of the positive electrode additives prepared according to Preparation Example 1 was measured with an amount of 0.1 M HCl used until pH 4 through pH titration. First, 5 g each of the positive electrode active materials prepared in Preparation Example 1 was added to 100 mL of DIW, stirred for 15 minutes and filtered, and then 50 mL of the filtered solution was obtained, treated with 0.1 M HCl, followed by measuring HCl consumption according to a pH change to determine Q1 and Q2. From the result, unreacted LiOH and $Li_2CO_3$ were calculated.

$$M1 = 23.95 \text{ (LiOH Molecular weight)}$$

$$M2 = 73.89 \text{ (Li}_2\text{CO}_3 \text{ Molecular weight)}$$

$$\text{LiOH(ppm)} = \frac{(Q1 - Q2) * M1 * \text{HCl con.} * DIW(g)}{\text{Solution}(g) * \text{powder}(g)} * 10{,}000$$

$$\text{Li}_2\text{CO}_3(\text{ppm}) = \frac{2 * Q2 * M2/2 * \text{HCl con.} * DIW(g)}{\text{Solution}(g) * \text{powder}(g)} * 10{,}000$$

The results of measuring the content of a Li byproduct present in the positive electrode active material by the above-described equations are shown in Table 2 below.

TABLE 2

| Classification | LiOH (ppm) | $Li_2CO_3$ (ppm) | Li by-product (wt %) |
|---|---|---|---|
| Example 1 | 31,832 | 8,143 | 1.08 |
| Example 2 | 36,600 | 9,033 | 1.23 |
| Example 3 | 39,112 | 8,795 | 1.3 |
| Comparative Example 1 | 45,233 | 25,842 | 1.8 |
| Comparative Example 2 | 49,442 | 8,723 | 1.6 |
| Comparative Example 3 | 49,349 | 10,326 | 1.62 |
| Comparative Example 4 | 52,331 | 20,365 | 1.9 |
| Comparative Example 5 | 44,134 | 9,200 | 1.45 |
| Comparative Example 6 | 44,236 | 8,836 | 1.45 |

Referring to the results of Example 1, and Comparative Examples 1 to 3, it was confirmed that the content of a Li byproduct in the positive electrode additive according to Example 1 was smaller than that of the Li byproduct in the positive electrode additives according to Comparative Examples 1 to 3. This result is also related to the NiO content in the positive electrode additive, and expected to result from the promotion of NiO lithiation due to simultaneous use of an Al-containing raw material and a B-containing raw material compared to the case in which an Al-containing raw material or a B-containing raw material was not used or used alone in calcination of the mixture of NiO and $Li_2O$, and thus the reduction in content of the Li byproduct in the positive electrode additive.

In addition, referring to the results of Example 1 and Comparative Example 6, it was confirmed that the content of the Li byproduct in the positive electrode additive according to Example 1 was lower even with the same content of $Al_2O_3$ mixed in the preparation of the positive electrode additive. The result is expected to result from insufficient induction of NiO lithiation due to a decrease in content of a B-containing raw material compared to the content of an Al-containing raw material in calcination of the mixture of NiO and $Li_2O$, and thus insufficient inhibition of the production of a Li byproduct.

Experimental Example 3. Evaluation of Electrochemical Properties of Lithium Secondary Battery The initial charge capacity, initial discharge capacity, initial reversible efficiency and discharge capacity rate (C-rate) of the lithium secondary batteries produced according to Preparation Example 2 were measured by performing charge/discharge experiments using an electrochemical analyzer (Toyo, Toscat-3100) at 25° C. in a voltage range of 3.0V to 4.3V at a discharge rate of 0.1 C to 5.0 C.

In addition, the lithium secondary batteries produced by the above-described method were subjected to 50 cycles of charging/discharging at 25° C., within a driving voltage range of 3.0V to 4.4V under a 1C/1C condition, and a ratio of the discharge capacity at the $50^{th}$ cycle with respect to an initial capacity (cycle capacity retention) was measured.

Meanwhile, the initial resistance of the lithium secondary batteries produced according to Preparation Example 2 was measured in a frequency range (10 kHz to 0.01 Hz) using electrochemical impedance spectroscopy (EIS).

The measurement results are shown in Table 3 below.

TABLE 3

| Classification | Initial charge capacity (mAh/g) | Initial discharge capacity (mAh/g) | Initial reversible efficiency (%) | Lifetime characteristics (%) |
|---|---|---|---|---|
| Example 1 | 407.2 | 137.9 | 33.9 | 71.1 |
| Example 2 | 391.8 | 135.3 | 34.5 | 70.4 |
| Example 3 | 382.5 | 129.7 | 33.9 | 70.1 |
| Comparative Example 1 | 365 | 123.8 | 33.9 | 67.3 |

TABLE 3-continued

| Classification | Initial charge capacity (mAh/g) | Initial discharge capacity (mAh/g) | Initial reversible efficiency (%) | Lifetime characteristics (%) |
|---|---|---|---|---|
| Comparative Example 2 | 381.2 | 127.4 | 33.4 | 68.8 |
| Comparative Example 3 | 378.1 | 127.2 | 33.6 | 69.7 |
| Comparative Example 4 | 385.4 | 121.9 | 31.6 | 68.9 |
| Comparative Example 5 | 361.1 | 121.1 | 33.5 | 68.8 |
| Comparative Example 6 | 366.4 | 123.2 | 33.6 | 70 |

Referring to the results shown in Table 3, it was confirmed that the positive electrode additives according to Examples 1 to 3 exhibited higher charge capacity, heating efficiency and lifetime characteristics compared to those of Comparative Examples.

Experimental Example 5. Evaluation of Stability of Lithium Secondary Battery

A volume change in the lithium secondary batteries produced in Preparation Example 2, caused by gas generation in the lithium secondary batteries, was measured after the batteries were charged to 4.25V with a constant current of 0.2 C, and stored at 60° C. for 14 days. The results of measuring the volume change are shown in Table 4 below.

TABLE 4

| Classification | Volume increase rate (%) |
|---|---|
| Example 1 | 19.2 |
| Comparative Example 1 | 36.7 |
| Comparative Example 2 | 28.2 |
| Comparative Example 3 | 24.8 |

Referring to the results of Table 4, it can be confirmed that the volume change in the positive electrode additive according to Example 1 is smaller than those of the lithium secondary batteries using the positive electrode additives according to Comparative Examples 1 to 3.

Positive electrode additives according to various embodiments of the present invention have advantages of stably maintaining the electrochemical properties of a lithium secondary battery by reducing the irreversible capacity loss of a negative electrode and reducing gelation and gas generation caused by a conventional positive electrode additive by dramatically reducing a content of a Li byproduct in a positive electrode additive.

In addition, positive electrode additives according to various embodiments of the present invention can be prepared through a one-pot calcination process after doping with a precursor of the positive electrode additive and mixing a coating source, and therefore there is an advantage for a production process in that additional thermal treatment for doping and/or coating of the positive electrode additive is not needed.

Further, in the case of a positive electrode material prepared by mixing the positive electrode additive and the positive electrode active material, it is possible to prevent the decrease in electrochemical properties and stability of the positive electrode active material derived from an excessive Li byproduct in advance, various electrochemical properties such as capacity characteristics, lifetime characteristics, and rate characteristics, which are important indictors for evaluating the performance of a lithium secondary battery, can be improved.

In the above, the embodiments of the present invention have been described, but it will be understood by those of ordinary skill in the art that the present invention pertains to may be changed and modified in various ways by addition, modification, or deletion of components without departing from the spirit of the present invention defined in the appended claims.

What is claimed is:

1. A positive electrode material for a lithium secondary battery, comprising:
   a positive electrode active material; and
   a positive electrode additive comprising a lithium metal oxide represented by Formula 1 below:

$$Li_{2+a}Ni_{1-b-c-d}Al_bB_cM1_dO_{2+e}$$ [Formula 1]

(Here,
M1 is at least one selected from W, Si, Ga and P,
$-0.2 \leq a \leq 0.2$, $0 \leq b \leq 0.05$, $0 \leq c \leq 0.05$, $0 < d \leq 0.05$, and $0 \leq e \leq 0.2$),
wherein the molar ratio of B and Al (B/Al molar ratio) in the positive electrode additive is 0.5 to 10, and
wherein a deviation of Al/Ni is uniformly maintained throughout a surface, a core, and a center of the lithium metal oxide.

2. The positive electrode material of claim 1 further comprising $Li_5AlO_4$, wherein the content of $Li_5AlO_4$ is 3.0 wt % or less with respect to the total weight of the positive electrode additive.

3. The positive electrode material of claim 1 further comprising NiO, wherein the content of NiO is less than 11.0 wt % with respect to the total weight of the positive electrode additive.

4. The positive electrode additive material of claim 1 further comprising LiOH and $Li_2CO_3$, wherein the sum of the contents of LiOH and $Li_2CO_3$ is less than 1.45 wt % with respect to the total weight of the positive electrode additive.

5. The positive electrode material of claim 1, wherein a coating layer in which a B-containing oxide is present is formed on at least a part of the surface of the lithium metal oxide.

6. The positive electrode material of claim 5, wherein the B-containing oxide is represented by Formula 2 below:

$$fLi_2O*(1-f)B_gM2_hO_i$$ [Formula 2]

(Here,
M2 is at least one selected from Mn, P, Sr, Ba, Ti, Zr, Al, Hf, Ta, Mg, V, Zn, Si, Y, Sn, Ge, Nb, W and Cu,
$0 < f \leq 0.8$, $0 < g \leq 8$, $0 \leq h \leq 8$, and $0 < i \leq 13$).

7. The positive electrode material of claim 6, wherein the coating layer has a thickness of 1 to 100 nm.

8. The positive electrode material of claim 1, wherein the positive electrode active material is represented by Formula 3 below:

$$Li_wNi_{1-(x+y+z)}Co_xM3_yM4_zO_{2+\alpha}$$ [Formula 3]

(Here,
M3 is at least one selected from Mn or Al,
M4 is at least one selected from Mn, P, Sr, Ba, B, Ti, Zr, Al, Hf, Ta, Mg, V, Zn, Si, Y, Sn, Ge, Nb, W and Cu,
M3 and M4 are different elements,
$0.5 \leq w \leq 1.5$, $0 \leq x \leq 0.50$, $0 \leq y \leq 0.20$, $0 \leq z \leq 0.20$, and $0 \leq \alpha \leq 0.02$).

9. A positive electrode comprising the positive electrode material of claim 1.

10. A lithium secondary battery using the positive electrode of claim 9.

* * * * *